(12) United States Patent
Piekarski et al.

(10) Patent No.: US 7,016,350 B2
(45) Date of Patent: Mar. 21, 2006

(54) DATA SWITCH AND A METHOD FOR CONTROLLING THE DATA SWITCH

(75) Inventors: Marek Stephen Piekarski, Macclesfield (GB); Paul Graham Howarth, Sale (GB); Yves Tchapda, Manchester (GB)

(73) Assignee: Xyratex Technology Limited, Havant Hampshire (GB)

( * ) Notice: Subject to any disclaimer, the term of this patent is extended or adjusted under 35 U.S.C. 154(b) by 1003 days.

(21) Appl. No.: 09/850,320

(22) Filed: May 7, 2001

(65) Prior Publication Data

US 2002/0141397 A1    Oct. 3, 2002

(51) Int. Cl.
*H04L 12/28* (2006.01)
(52) U.S. Cl. .................. 370/390; 370/394; 370/415
(58) Field of Classification Search ............. 370/229, 370/351–357, 360, 369–390, 394, 395, 395.1, 370/395.4, 395.42, 412–414
See application file for complete search history.

(56) References Cited

U.S. PATENT DOCUMENTS 5,537,403 A * 7/1996 Cloonan et al. ............ 370/352
5,602,830 A * 2/1997 Fichou et al. ............... 370/232
6,009,097 A * 12/1999 Han ....................... 370/395.52
6,219,350 B1 * 4/2001 Lee ......................... 370/395.61
6,570,873 B1 * 5/2003 Isoyama et al. ............ 370/375
6,577,631 B1 * 6/2003 Keenan et al. .............. 370/394
6,665,495 B1 * 12/2003 Miles et al. .................. 398/54

FOREIGN PATENT DOCUMENTS

| WO | WO 99/40754 | 8/1999 |
| WO | WO 99/43131 | 8/1999 |
| WO | WO 00/38375 | 6/2000 |
| WO | WO 01/76157 | 10/2001 |

* cited by examiner

*Primary Examiner*—John Pezzlo
*Assistant Examiner*—Dmitry Levitan
(74) *Attorney, Agent, or Firm*—Bracewell & Giuliani LLP

(57) ABSTRACT

A data switch is proposed of the type having virtual queue ingress routers interconnected with egress routers by way of a memoryless switching matrix controlled by a control unit which performs an arbitration process to schedule connections across the switch. This scheduling is performed to ensure that data cells which arrive at the ingress routers at unpredictable times are transmitted to the correct egress routers. Each ingress router further includes a queue for time division multiplex traffic, and at times when such traffic exists, the control unit overrides the arbitration process to allow the time division multiplex traffic to be transmitted through the switch.

8 Claims, 3 Drawing Sheets

DATA SWITCH AND A METHOD FOR CONTROLLING THE DATA SWITCH

FIELD OF THE INVENTION

The present invention relates to methods for controlling a data switch which passes data, including time division multiplexed data, selectively between a plurality of data input ports and a plurality of data output ports. The invention further relates to such a switch.

DESCRIPTION OF THE PRIOR ART

Our patent applications PCT/GB99/03748 and PCT/GB99/00405 (respectively published as WO 00/038375 and WO 99/43131, the disclosures of which are incorporated herein by reference in their entirety) show data switches which comprise a plurality of input ports, which are operated by respective ingress routers, and a plurality of output ports, which are operated by respective egress routers. The input and output ports are interconnected by a switching matrix under the control of a control unit. The switching matrix can form connections between selected ones of the input and output ports. Cells of incoming data arrive at one of the input ports for transmission to one of the output ports, and each input port is provided with one or more virtual output queues (VOQs) for each of the output ports. A cell of data received at a given input port and directed to a particular output port is placed into one of the VOQs of that input port corresponding to that output port. On each switch cycle, the control unit controls the switching matrix to connect a selected set of input ports to respective output ports, and each of those inputs ports transmits to the corresponding output port a cell of data taken from a VOQ corresponding to that output port.

WO 99/43131 discloses in detail algorithms to be used by the control unit to determine which respective output port to connect to each input port in each switching cycle. Each cell of data is associated with a priority level, and each ingress router operates a VOQ for each output port and priority level. Each VOQ is for storing cells of the corresponding priority level and destined for the corresponding output port. When a new cell arrives at an ingress router, it is placed in the appropriate queue, and a request for a connection between the corresponding input and output ports is passed to the control unit. To process these incompatible requests, the control unit performs an arbitration process which includes a first pipeline stage to satisfy at least some of the requested interconnections. A priority mixer of the control unit receives those requests for interconnections which were not satisfied by the first pipeline stage together with requests of a different priority level. The priority mixer operates to select which of those requests should be further considered and applied to a second pipeline stage. This second pipeline stage is operable to satisfy such of those requests as are possible. Further pipeline stages are provided, to which are applied those requests not satisfied by any preceding pipeline stages.

A data switch of this kind is successful in processing cells having unpredictable arrival times (Bernoulli traffic patterns). For such cells, the degree of congestion in the switch cannot be controlled, and hence the cell latencies are inevitably unbounded.

SUMMARY OF THE PRESENT INVENTION

While many traffic types are composed entirely of cells having unpredictable arrival times, certain traffic types do have predictable arrival characteristics. Two such traffic classes are TDM (time division multiplexed) traffic and CBR (constant bit rate) traffic.

The present invention seeks to provide a method, a switch and a control device for a switch, which are suitable for switching data including both unpredictable traffic and TDM traffic having predictable arrival times.

In general terms the invention provides that each ingress router is provided with a queue for receiving time division multiplex traffic segmented into cells. When such cells are present, the control unit overrides the normal arbitration procedure to provide appropriate switch connections for them.

The invention thus makes it possible to reduce, or even eliminate, variation in the latency of the throughput of time division multiplexed traffic.

Specifically, the invention provides a data switching system having a plurality of virtual output queue ingress routers, a plurality of egress routers, a control unit, and a memory-less switching matrix for interconnecting selected ingress routers and egress routers, the ingress routers being arranged to receive data traffic segregated into equal sized cells having a header including an egress router output path address, to route the cells into virtual output queues in the ingress router in accordance with the egress router output path address and to generate connection requests for transmission to the control unit, the control unit being arranged to arbitrate among the connection requests and control the switching matrix to schedule the connections across the switch, characterised in that a separate queue is provided in each ingress router for time division multiplex traffic segmented into a plurality of standard cells and the control unit includes a time division multiplex connection unit arranged to override the normal arbitration procedure for each time division multiplex frame and to provide the switch connections for the cells of the time division multiplex frame.

The TDM traffic may thus be arranged to be inherently free of congestion. Any congestion is resolved by the higher level connection establishment processes. The present invention makes it possible to establish connections in such a way that cells can always be forwarded without any queuing or arbitration. This feature is potentially of great value, since a prime requirement for a switch matrix handling TDM traffic is to present a low, clearly defined latency to TDM cells.

At a switch or any other node the arrival of a cell is known in advance to a high degree of precision and therefore there is no need to generate requests to an arbiter. Instead, the TDM connection unit may be informed at network connection set-up time of the timing associated with the expected cell arrivals. By reference to this TDM connection unit, the control unit can create the crossbar connections "just-in-time" for the cell arrival.

Each ingress router preferably receives the TDM cells from a processor which receives TDM traffic (e.g. in standard SONET format) and converts it into standard cells, for example into cells of the standard size of the non-TDM data packets and with any header requirements. The processor may be programmed using a fabric management interface (FMI), so that the processor and TDM connection unit both may operate based on the same data, so that their action is co-ordinated.

A processor may further be provided at each egress router for re-converting the format of cells which have passed through the switch into a standard TDM traffic format. In many systems, each ingress router is associated with a respective egress router, and in this case the two processors may be provided within a single processor unit.

Preferably, even at times at which the control unit is arranging for TDM traffic to be correctly transmitted, the control unit determines whether it is additionally possible to satisfy requests generated by the ingress routers and relating to other traffic (i.e. non-TDM traffic, also referred to here as "packet traffic"). For example, the control unit may include, effectively, a first pipeline stage operated by the TDM connection unit which ensures that the TDM traffic is satisfied, and at least one further pipeline stage which satisfies at least some requests which do not conflict with the TDM traffic. These further pipeline stages may be performed by essentially any known arbitration mechanism but are preferably performed using our known techniques described above. Preferably, there is one stage of trying to satisfy multicast requests, followed by one or more stages of trying to satisfy other ("unicast") requests.

BRIEF DESCRIPTION OF THE FIGURES

A non-limiting embodiment of the invention will now be described, for the sake of example only, with reference to the following figures, in which.

DESCRIPTION OF THE EMBODIMENTS

Figure 1:
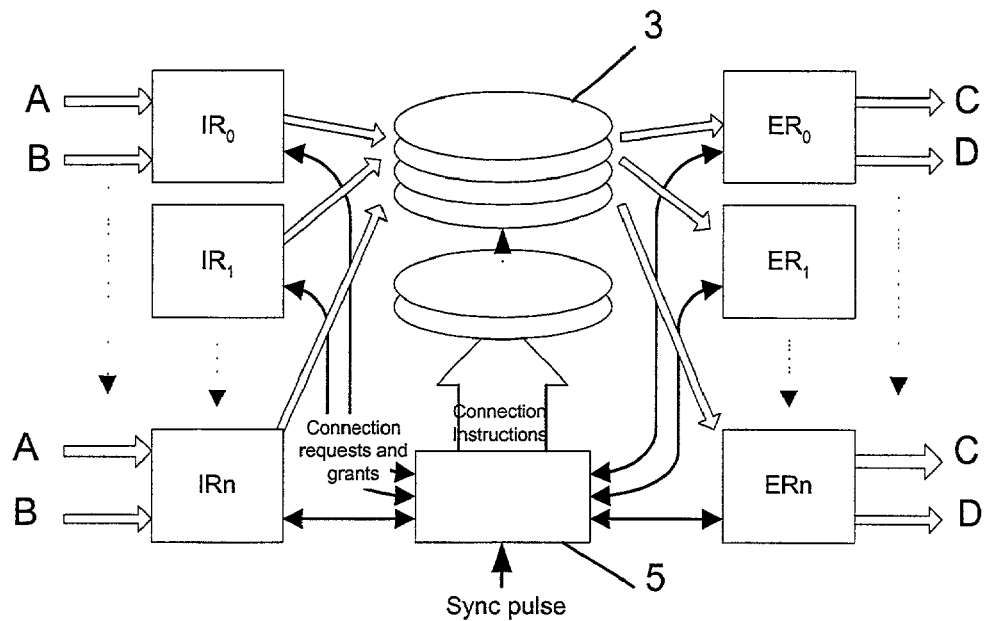
FIG. 1 shows the overall structure of a switch which is an embodiment of the present invention.

FIG. 1 shows an embodiment of a switch according to the present invention. The switch includes n+1 ingress routers (where n is a positive integer, such as 31) labelled $IR_0$ to $IR_n$, and an equal number n+1 of egress routers labelled $ER_0$ to $ER_n$. The ingress routers and egress routers are connected by a switching matrix 3 which is capable of connecting any set of ingress routers to any set of egress routers. The switch is controlled by a control unit 5, which defines the connections the switching matrix 3 makes, by generating connection instructions and transmitting them to the switching matrix 3.

Each of the ingress routers $IR_0$ to $IR_n$ receives data from two input buses, labelled A and B. Input bus A, which may be a conventional common switch interface (CSIX) or Intel Internet exchange bus (IXBus), transmits data cells to the corresponding ingress router at times which are not predefined. The ingress router is provided with VOQs for each of the egress routers $ER_0$ to $ER_n$ and priority levels (i.e. the number of VOQs is equal to n+1 times the number of priority levels). It is further provided with at least one multicast VOQ, for storing data cells which arrive at times which are not predefined and are intended for broadcast to multiple egress routers. A cell of data including a header is commonly referred to as a "tensor", and is composed of a number (e.g. 6 or 8) of "vectors", where a vector consists of one byte per plane of the switching matrix and is transferred though it in one system clock cycle.

On receiving a data cell via input A, the ingress router places it in the corresponding VOQ and generates a connection request, which it transmits to the control unit 5 in a conventional way.

In the absence of TDM traffic (which is described below) the control unit 5 operates, in each "arbitration period" (also commonly referred to as a switching cycle), an arbitration process as described in WO 99/43131 to decide which connections to instruct the switching matrix 3 to perform. For example, in the case that one or more multicast requests are present, the control unit decides to satisfy those requests (in the case that the multiple requests are in conflict, an arbitration procedure may be required). The control unit then attempts to find other requests (i.e. non multicast ones) to satisfy which do not conflict with the satisfied multicast request(s). Firstly, it tries to satisfy requests of the highest priority level, but in one or more further stages a priority mixer is used to search among requests of differing priority levels.

Once the arbitration is complete, the control unit accordingly sends instructions to the switching matrix 3, and notifies ingress routers $IR_0$ to $IR_n$ and egress routers $ER_0$ to $ER_n$ of the connection which is to be made and the cell which is to be transmitted.

The input bus B corresponding to each ingress router is a bus for time division multiplex data cells. A CSAR (circuit-switched application router, not shown in FIG. 1 but described below) may be provided to interface this input bus to an industry-standard telecom bus and thence to a SONET (synchronous optical network) framer device, which generates the time division multiplex (TDM) traffic.

For example, assuming an OC48 SONET link with STS-1 granularity, a 125 $\mu$s period will see 48 SONET frames (810 bytes each) arrive at the switch in a known byte interleaved sequence and the pattern will repeat every 125 $\mu$s. Thus, each frame represents 51.84 MB/s. Each frame will expect to be switched to a specific output port. The SONET infrastructure provides a synchronisation pulse termed a master frame pulse (MFP) which defines the start of the 125 $\mu$s period. The SONET frames are segmented to match the preferred tensor size, that is the size of data cells other than TDM cells which the switch is designed to handle. Since a multiservice switch will be transporting a mixture of packet and TDM traffic, the tensor size is chosen to deliver the best performance for the packet traffic. In practice this means that an 810 byte SONET frame is preferably segmented into 10–32 tensors each of which is sent through the matrix independently.

Figure 2:
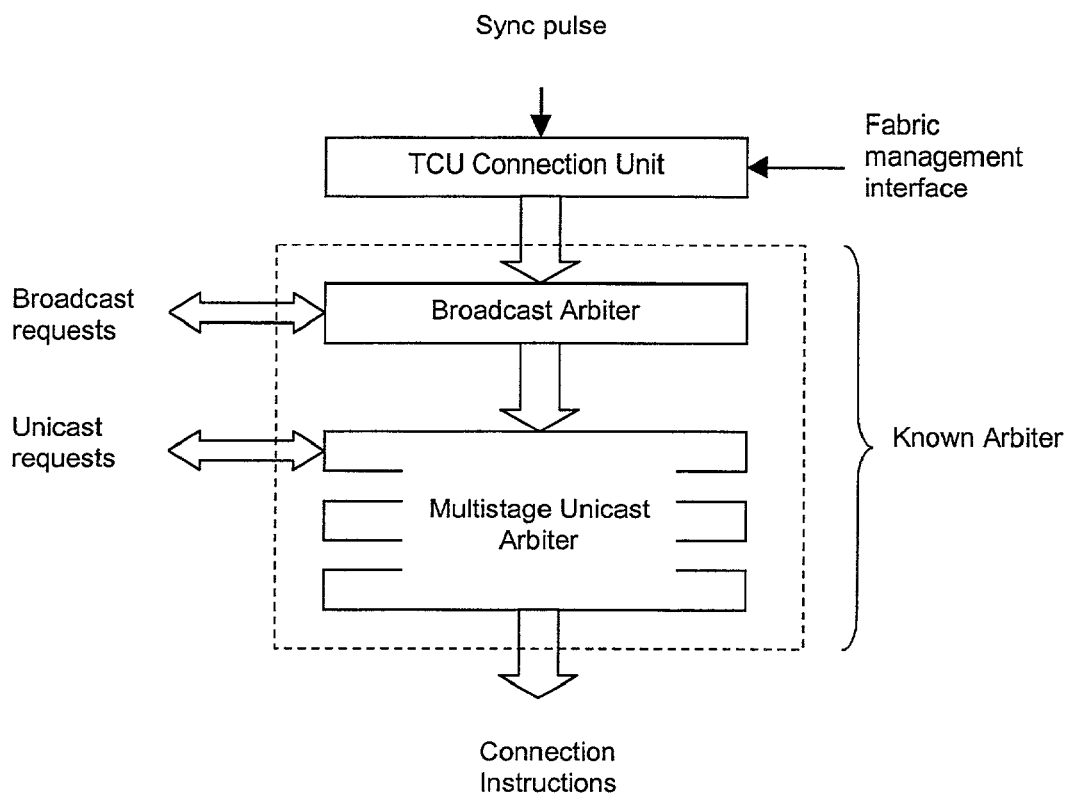
FIG. 2 illustrates the operation of a control unit in the embodiment of FIG. 1.

The control unit 5 is provided with an input for receiving the synchronisation pulse (master frame pulse). The structure of this control unit 5 is illustrated in FIG. 2. The pulse is directed within the control unit to a "TDM connection unit" (TCU) which stores a table which contains a number of sets of connections—at most one set for each arbitration period included in the 125 $\mu$s period of the SONET pattern. At each arbitration period the TDM connection unit reads the corresponding set of connections (if any such set exists), and outputs it. This set of connections ensures that the TDM connections are properly made.

The output of the TDM connection unit is transmitted to a known arbiter of the kind described in WO 99/43131, which performs the operations described above in to satisfy the requests, in so far as this does not alter the connections specified by the TCU connection unit. That is, the output of the TDM connection unit is passed to a broadcast arbiter which arbitrates between the broadcast requests and, if this is possible, supplements the output of the TDM connection unit by connections which satisfy one or more broadcast requests (a notification of this fact is sent to the corresponding ingress and egress routers). Then, the output of the broadcast arbiter is sent to a multistage arbiter section which tries to supplement the set of connections received from the broadcast arbiter so as to satisfy one or more unicast requests (i.e. requests a connection between only one ingress router and one egress router), and if this is successful notifies the corresponding ingress and egress routers. The output of the control unit 5 is thus a set of control instructions for transmission to the switch 3 which certainly satisfies all the TDM requirements, and may additionally satisfy one or more of the broadcast and/or unicast requests.

The egress routers $ER_0$ to $ER_n$ distinguish between data cells sent to them which relate to non-TDM or TDM traffic. The former is output via output bus C, and the latter via output bus D. The cells sent through output bus C correspond to those in known systems, and will hence not be described further. The ones output through output bus D are sent to a CSIX (not shown in FIG. 1 but described below).

Figure 3:
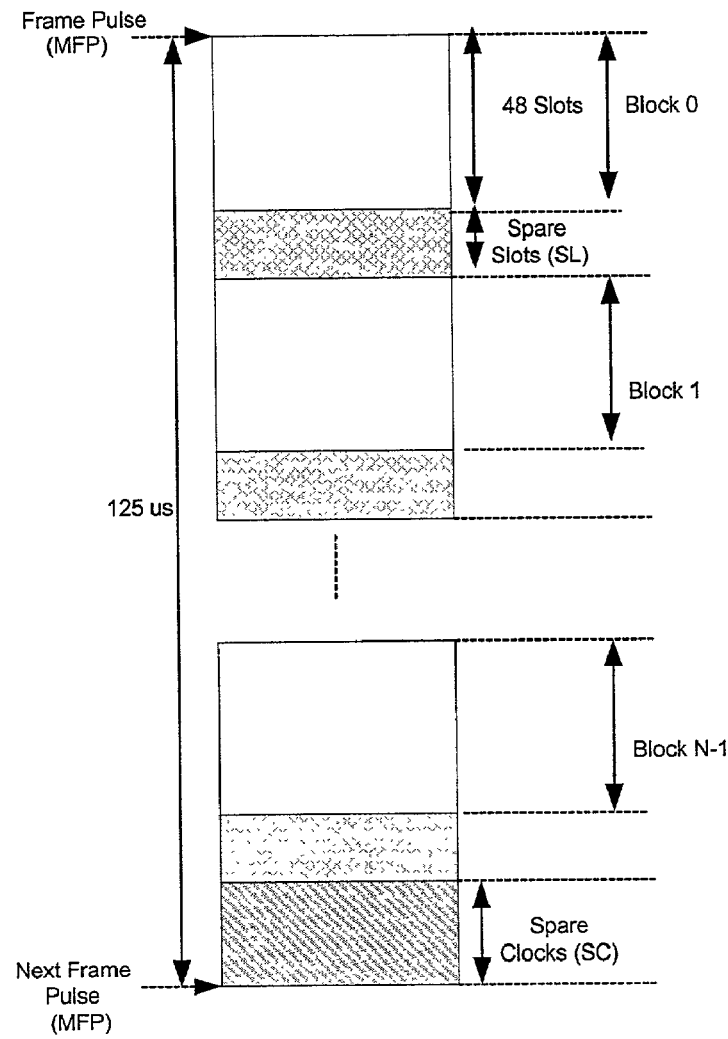
FIG. 3 illustrates the structure of a table employed by the control unit of FIG. 2, and which row of the table is read at each of a number of respective times.
Figure 4:
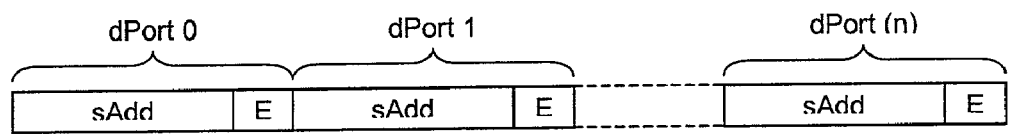
FIG. 4 illustrates the structure of one row of the table of FIG. 3.

The structure of the table stored in the TDM connection unit will now be described with reference to FIGS. 3 and 4. FIG. 3 shows the table stored in the TDM connection unit, and which row of the table is read at each of a number of times (shown in the vertical direction starting from the syncronisation pulse (MFP) which defines the start of the frame). Rows of the table ("slots") correspond to respective arbitration cycles. The table contains a number of sections called "blocks" lasting 48 arbitration periods. Each arbitration period corresponds to one row of the table. FIG. 4 shows the structure of single a row of the table.

Starting with the synchronisation pulse, the SONET line delivers the 48 byte-interleaved frames. When sufficient bytes have been accumulated for one tensor per frame, the 48 tensors are forwarded across the matrix by the first block of 48 rows of the table. Since the matrix 3 has a degree of overspeed relative to the SONET line ends, even a fully utilised matrix will not need to have all the table entries configured. Specifically, due to the overspeed, there is then a period of time (SL arbitration cycles) for which the table is empty. This section of the table corresponds to the time before the next block of 48 TDM tensors are forwarded.

This pattern is repeated N times where N is the number of tensors required to transport a single SONET frame. Since the matrix clock period is not directly related to the SONET line bit rate, there is a final period (SC clock cycles) before the next synchronisation pulse.

A table row, illustrated in FIG. 4, consists of a crossbar connection set. Thus, in a n+1 port switch as shown in FIG. 1 it consists of n pairs of fields, labelled dPort0, dPort1, ..., dPort(n). Each pair of fields corresponds to a single respective output port. It consists of a first field sADD, of size $\log_2(n+1)$, which specifies an input port which may be connected to that output port, and a second field E, of size 1 bit, which indicates whether the connection to that specified input port is enabled.

The table provides an identical set of connection entries for each block, so the TDM connection unit only needs enough RAM to store one block, i.e. $48 \times (n+1) \times (1+\log_2(n+1))$ bits.

It should be noted that the 48 slots per block and n+1 fields per slot indicate the maximum bandwidth available to TDM traffic. In a multi-service switch which is carrying a mix of TDM and packet traffic, only some of the slots/fields would configured. Any unconfigured fields (E=0), plus the spare slots between blocks, are available to packet traffic.

It should also be noted that this scheme allows for multicast of TDM traffic by configuring the sAdd fields of multiple dPort entries to indicate the same input port.

We now turn to a more detailed explanation of the mechanisms employed in the embodiment. As mentioned above, an external circuit switched application router (CSAR) device, preferably a field programmable gate array (FPGA), takes in SONET frames over an industry-standard Telecom bus. These are separated into the STS-1 sub-frames, and each active STS-1 stream is divided into tensor-sized TDM cells. These are then sent to the switch via input bus A.

All 125 $\mu$s SONET frames start to arrive in all the CSARs aligned to a global SONET Framing Pulse (SFP). A CSAR sends the first TDM cell for the first STS-1 from a new frame a programmable time after the SFP. One cell from each of the other 47 STS-1 subframes is then sent, in a pre-determined order: this group of 48 cells corresponds to a block. The cell order is calculated externally according to the connections required in the matrix, and programmed into the CSAR over its fabric management interface (FMI). Note that inactive STS-1 sub-frames will send empty cells to avoid potential sequencing problems in the switch. The first non-empty cell in the new SONET frame is tagged with both StartOfFrame (SOF) and StartOfBlock (SOB) bits in the TDM cell header. The header also contains connection type, routing information, cell length, and sequence number to aid later reconstruction of the destination STS-1. A fixed time after the first block began transmission, the next block begins: this is again one (possibly empty) cell from each STS-1 and in the same order, with the first non-empty cell tagged with SOB. A programmed number of blocks are sent in this way to complete the SONET frame, after which the process restarts on the next SFP.

Each ingress router handles TDM cells received over its input bus B. The cells are normally stored in a single FIFO-organised TDM Ingress Queue (minimum depth 36 tensors), where they become waiting tensors. The entire cell is stored, including the full header. If a new cell contains the SOB bit, a StartOfBlock queue pointer register is made valid and updated with the address of that tensor in the queue: if it also contains the SOF bit, this too is remembered. If an arriving cell contains parity errors, an empty cell is stored in the queue, though such parity checking can optionally be disabled. No queue state changes are sent to the switch for the TDM Ingress Queue.

The data for the table of the TDM connection unit is calculated externally to match the CSAR's TDM cell ordering, and pre-loaded via the FMI. Note that although all 48 lines are always valid some lines may contain no connections, and since these connections are pre-calculated they can include true core-level multicasts. The table can be changed dynamically as the SONET cross-connect requirements change, via a shadow table. Note that the CSAR ordering table, the table of the TDM connection unit, and the SONET STS-1 routing requirements all match at all times.

The control unit 5 receives the synchronisation pulse (master framing pulse, MFP) a programmable delay after the global SONET Framing Pulse. This delay, and the CSAR's delay between the SFP and it sending the first cell of the new frame over the input bus B, are set up such that the first Grant signal arrives in the ingress router after the first cell from input bus B has been stored in the TDM ingress queue, but not so long after that the cell has been overwritten due to buffer overflow.

On the start of the first switching cycle following receipt of the MFP, the TDM connection unit of the control unit 5 reads the first line of the TDM RAM. Any connections defined in that line are guaranteed to be made, as explained above with reference to FIG. 2. The arbitration stages shown in FIG. 2 then fill in other connections for this switching cycle for normal non-TDM cell data according to their usual algorithms. At the start of the next switching cycle the second line of the TDM RAM is read, and so on for the 48 lines. The switch then waits for a programmed InterBlock-Gap (IBG) number of switching cycles before restarting from the first line of the TDM RAM for the next Block. After a programmed BlockCount (BC) number of passes through the RAM, the switch waits until the next MFP when the entire process repeats.

Figure 5:
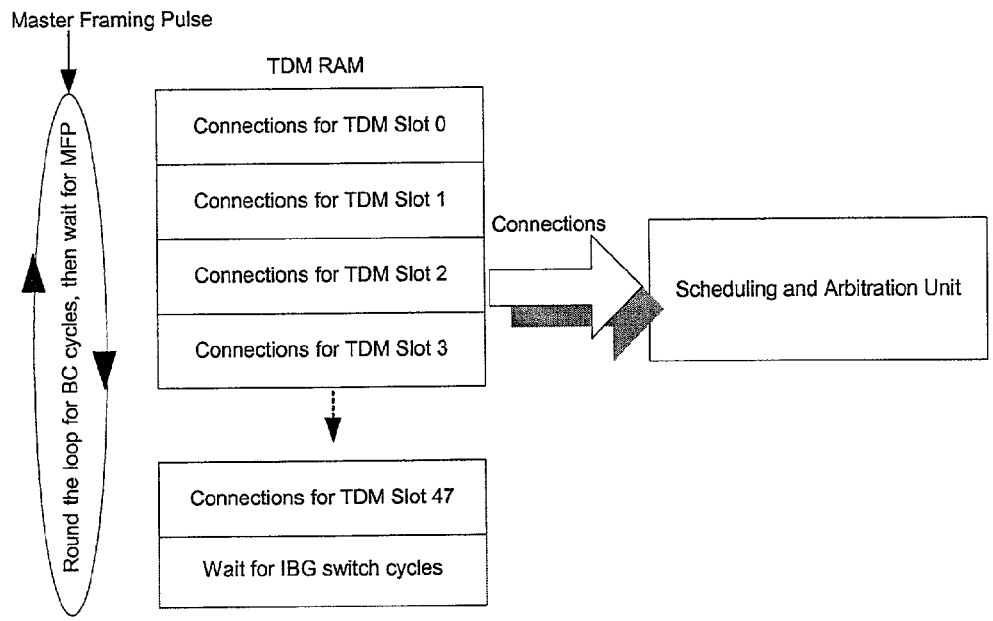
FIG. 5 illustrates the timing used by the switch of FIG. 1.

The content and cycling of the TDM RAM are illustrated in FIG. 5.

The values for IBG and BC depend on the tensor size: a larger tensor will need fewer blocks to convey the STS-1 sub-frames and can thus have a longer InterBlockGap. Table 1 sample numbers for IBG and BC, together with the resulting length of wait at the end of a frame for the next MFP (assuming all 810 bytes of the STS-1 are switched):

TABLE 1

| Vectors per tensor | Interblock gap (IBG) | Black count (BC) | Clocks before next MFP |
|---|---|---|---|
| 6 | 17 | 32 | 20 |
| 8 | 23 | 22 | 4 |
| 10 | 25 | 17 | 90 |
| 12 | 26 | 14 | 68 |
| 14 | 33 | 11 | 26 |
| 16 | 30 | 10 | 20 |

As in known systems, each set of connection instructions emerging from the control unit 5 results as usual in a Grant signal being sent to the ingress routers, and a TensorAvailable signal to the egress routers. The instructions include the destination port, connection type (unicast or multicast), and StartOfFrame and StartOfBlock flags indicating whether this is the first grant signal for this ingress port in the current frame (since MFP) or in the current Block (TDM RAM pass). Note that for multicast connections, instead of a single destination the TDM Grant signal sends the line number within the table of the TDM connection unit where this connection originated: the CSAR will have been programmed to send a similar destination value in the corresponding TDM cell.

Each router operates a rigorous checking scheme to match these incoming grant signals to tensors in its TDM ingress queue. If the CSAR and control unit have been set up in compatible ways, no cells have been lost or corrupted on the input bus B, and no grant signals have been lost between the control unit 5 and the ingress router, all checks (detailed below) should pass. The tensor is removed from the queue, appended to the usual 3-byte core header with a core header Type field set to hex 80, and transmitted to the matrix.

Figure 6:
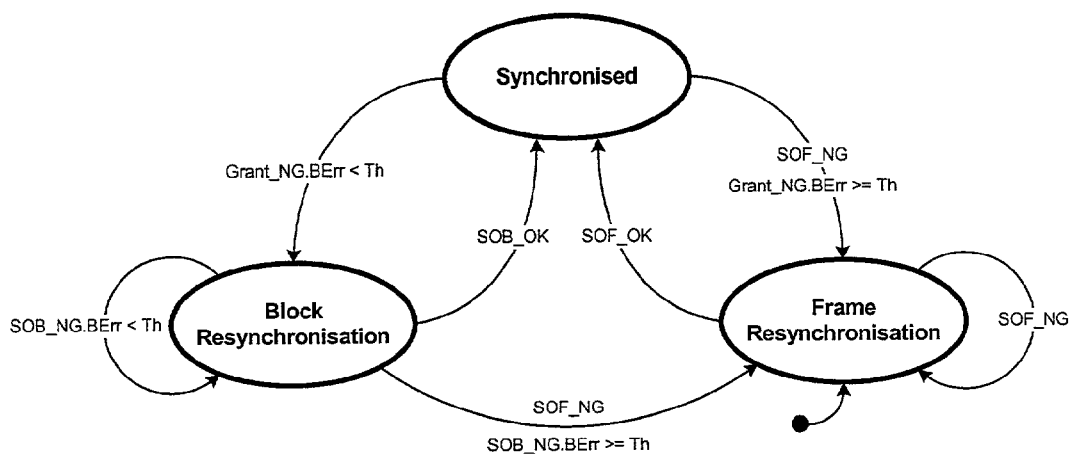
FIG. 6 shows the logical states of an ingress router in the embodiment of FIG. 1.

A state machine within the input router 1 and shown in FIG. 6 controls the handling of new cells arriving over the input bus B and these grant signal vs queue checks:

In Frame Resynchronisation mode, all TDM cells are discarded until a cell with SOF and SOB is received, then cells are stored normally. Grant signals result in generation and transmission of Null tensors (with a core header Type value of hex 8F) until a grant signal with SOF is received. If this grant signal matches the SOF tensor in the queue, that tensor is removed and transmitted, and the state machine enters Synchronised state. If the SOF grant signal fails to match, a null tensor is transmitted, a FrameErrorLog count is incremented, the queue is emptied, and we go back to discarding incoming cells.

In Synchronised state, the ingress router is in its normal operating mode. Arriving TDM cells are appended to the queue, and each grant signal should have the same destination and core type (unicast or multicast) as the tensor at the head of the queue. If these fail to match, the next three tensors in the queue are tested and the first to match is selected. A SOB grant signal always tests the tensor addressed by the valid StartOfBlock pointer, even if this is not at the head of the queue: for these, the tensor and grant signal SOFs must also match. A null tensor at the head of the queue (or in the next 3 entries) represents an earlier parity fail: these will match with any grant signal. If the StartOfBlock pointer is invalid when a SOB grant signal is received but any of these first four entries are null tensors, the null is assumed to be the corrupted SOB/SOF tensor and a match is generated.

A matching tensor is removed from the queue and transmitted to the matrix (with core header Type field of hex 80, or 8F for null tensors), and if this was not at the head of the queue all elder tensors are discarded. If no matching tensor could be found for a non-SOF grant signal and a BlockError counter is less than a programmable threshold, a null tensor is transmitted, the BlockError counter and a BlockErrorLog counter are incremented, all remaining tensors in the current block are discarded from the queue, and the state machine transitions to the Block Resynchronisation state. If no matching tensor could be found for a SOF grant signal or BlockError is equal to or greater than the programmable threshold, a null tensor is transmitted, the FrameErrorLog counter is incremented, all remaining tensors in the current frame are discarded from the queue, and the state machine transitions to the Frame Resynchronisation state. When an entire block of tensors and grant signals have matched with no null or discarded tensors BlockError is cleared.

In Block Resynchronisation mode, all TDM cells are discarded until a cell with SOB is received, then cells are stored normally. Grant signals result in generation and transmission of null tensors until a grant signal with SOB is received. If this grant signal matches the SOB tensor in the queue, that tensor is removed and transmitted, and the state machine enters Synchronised state. If the SOB grant signal fails to match and BlockError is less than the programmable threshold, a null tensor is transmitted, BlockError and BlockErrorLog are incremented, the queue is emptied, and we go back to discarding incoming cells. If the non-matching SOB grant signal is also a SOF or BlockError is equal to or greater than the programmable threshold, a null tensor is transmitted, FrameErrorLog is incremented, all remaining tensors in the current frame are discarded from the queue, and the state machine transitions to the Frame Resynchronisation state.

Note that BlockError is a count of recent block errors, which is automatically cleared when a full block has been received error-free. BlockErrorLog and FrameErrorLog however are only ever incremented by hardware and keep their contents until explicitly cleared via FMI.

On arrival in the egress routers, normal TDM tensors with a core Type field of hex 80 and good CRC are stored in a FIFO-organised TDM Egress Queue with a minimum depth of 12 tensors. Failing or null (8F) tensors are logged and discarded.

Complete tensors are sent in order as TDM cells over output bus D to the attached CSAR device, where they are assembled into STS-1 sub-frames for onward transmission. The sequence number within the TDM cell header allows the CSAR to leave gaps for any missing tensors in this re-assembly. Note that it is the responsibility of the CSAR to perform any multicasting to multiple STS-1s within the same SONET egress frame: the need for such a multicast is indicated in the TDM cell Type field, but the recipient STS-1 s is pre-programmed over the FMI.

The invention claimed is:

1. A data switching system having a plurality of virtual output queue ingress routers, a plurality of egress routers, a control unit, and a memory-less switching matrix for interconnecting selected ingress routers and egress routers,
the ingress routers being arranged to receive data traffic segregated into equal sized cells having a header including an egress router output path address, to route the cells into virtual output queues in the ingress router in accordance with the egress router output path address and to generate connection requests for transmission to the control unit,
the control unit being arranged to arbitrate among the connection requests and control the switching matrix to schedule the connections across the switch,
wherein a separate queue is provided in each ingress router for time division multiplex traffic segmented into a plurality of standard cells and the control unit includes a time division multiplex connection unit arranged to override the normal arbitration procedure for each time division multiplex frame and to provide the switch connections for the cells of the time division multiplex frame,
the control unit being arranged, in each of a plurality of arbitration periods, to determine whether the requests include requests compatible with said connections specified by the time division multiplex connection unit, and, if one or more such requests are found, to control the switching matrix to perform the connection specified by these requests, the control unit including a first pipeline stage performed by said time division multiplex connection unit, a second pipeline stage for satisfying any multicast requests compatible with the connections specified by the time division multiplex connection unit, and one or more stages for satisfying unicast requests compatible with the connections specified by the time division multiplex connection unit and by any satisfied multicast requests.

2. A system according to claim 1 in which the time division multiplex connection unit includes an interface for receiving data specifying the switch connections for the cells of the time division multiplex frame.

3. A system according to claim 1 further including, for each ingress router, a processor which receives time division multiplex traffic in a first format and converts it into standard cells.

4. A system according to claim 3 in which the processor includes an interface for receiving data specifying how time division multiplex traffic is converted into standard cells.

5. A data switching method for controlling a data switch having a plurality of virtual output queue ingress routers, a plurality of egress routers, a control unit, and a memory-less switching matrix for interconnecting selected ingress routers and egress routers,
the ingress routers being arranged to receive data traffic segregated into equal sized cells having a header including an egress router output path address, to route the cells into virtual output queues in the ingress router in accordance with the egress router output path address and to generate connection requests for transmission to the control unit,
the control unit being arranged to arbitrate among the connection requests and control the switching matrix to schedule the connections across the switch,
wherein the method includes: providing a separate queue in each ingress router for time division multiplex traffic segmented into a plurality of standard cells; and
using a time division multiplex connection unit to override the normal arbitration procedure for each time division multiplex frame to provide the switch connections for the cells of the time division multiplex frame,
determining whether said requests include requests compatible with said connections specified by the time division mutiplex connection unit, and, if one or more such requests are found, to control the switching matrix to perform the connection specified by these requests in which said determination step includes a stage of satisfying any multicast requests compatible with the connections specified by the time division multiplex connection unit, and one or more stages of satisfying unicast requests compatible with the connections specified by the time division multiplex connection unit and by any satisfied multicast requests.

6. A method according to claim 5 further including storing in the time division multiplex connection unit data specifying the switch connections for the cells of the time division multiplex frame.

7. A method according to claim 5 further including receiving time division multiplex traffic in a first format, converting it into standard cells, and transmitting it to said ingress routers.

8. A method according to claim 7 in which the conversion is performed by a processor which includes an interface for receiving data specifying how time division multiplex traffic is to be converted into standard cells.

* * * * *